H. J. JANSEN.
DRILL.
APPLICATION FILED NOV. 1, 1918.

1,332,841.

Patented Mar. 2, 1920.

Witnesses
J. T. L. Wright

Inventor
Henry J. Jansen

By Victor J. Evans
Attorney

UNITED STATES PATENT OFFICE.

HENRY J. JANSEN, OF BREESE, ILLINOIS.

DRILL.

1,332,841. Specification of Letters Patent. Patented Mar. 2, 1920.

Application filed November 1, 1918. Serial No. 260,698.

*To all whom it may concern:*

Be it known that I, HENRY J. JANSEN, a citizen of the United States, residing at Breese, in the county of Clinton and State of Illinois, have invented new and useful Improvements in Drills, of which the following is a specification.

This invention relates to an improvement in drills, particularly for miner's use, and of that type provided with a drill, and a side cutting tool, whereby the size of the hole is materially enlarged with respect to the drill.

In such drills as used, it frequently happens that the side cutting tools, by reason of an obstruction or a comparatively open space are not guided in a true line and will tend to move sidewise or laterally and thus deflect the drill, so that the hole bored thereby is not true. The invention is particularly concerned with means for overcoming this, by providing the drill bar, at a point directly opposite the side cutting tool, with guiding means, which will maintain the tool centered, under all conditions of use.

The invention is illustrated in the accompanying drawing, in which:—

Figure 1:
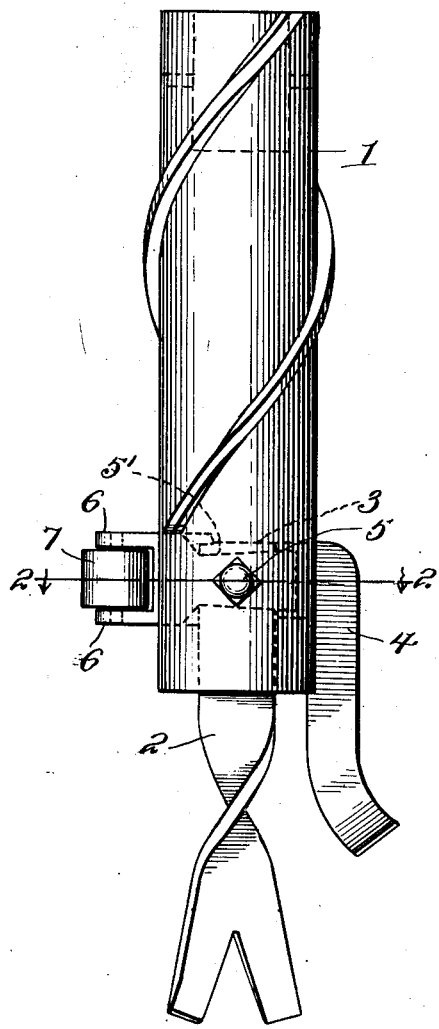
Figure 1 is a plan view of the improved tool.
Figure 2:
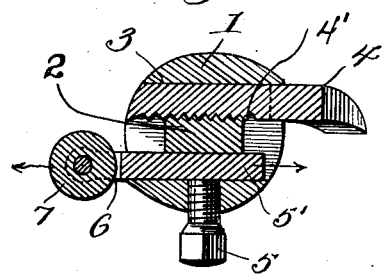
Fig. 2 is a transverse section on the line 2—2 of Fig. 1.
Figure 3:
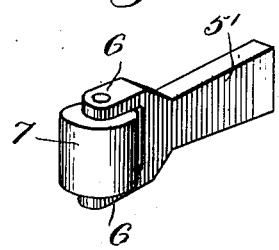
Fig. 3 is a perspective view of the roller member.

The invention is here shown as applied to a miner's drill, and for the purposes of the present invention is shown to include a drill bar 1, from the lower opposite end of which extends the usual boring tool 2. This tool is shown as of a preferred type, but it is contemplated that any desired tool may be applied as a drill point.

Adjacent the lower end of the bar 1 is formed a transversely disposed groove 3, through which the lateral end 4 of the side cutting tool 4 is extended, and as ordinarily constructed the opening 3 is of a size to receive the lateral portion of the side cutting tool, a set screw 5 being ordinarily employed to secure the side cutting tool in position. If desired the meeting faces of the side boring tool and the vertical boring tool may be serrated, as at 4' to insure a more complete holding action.

As the side cutting tool operates only on one edge it is apparent that if not met with the proper resistance there would be a tendency to a lateral deflection of the boring tool, and hence the hole is not bored true. To overcome this I have provided a roller member including a bar 5 cutaway at one end to present spaced parallel bearing arms 6, between which is mounted a roller 7. For the purposes of my invention the opening 3 in the bar 1 is enlarged, and the bar 5 is passed therethrough.

It is understood that the bar 5 is adjusted in the opening 3, so that the roller will project beyond the surface of the bar 1, a distance corresponding to the maximum projection of the side cutting tool. In this position of the parts it will be noted that the set screw 5 bears upon the bar 5', and through the latter, binds the boring tool 2 and the side cutting tool 4 in place.

It is of course apparent that the roller is diametrically opposed to the side cutting tool and that it acts as a means for restraining any lateral deflection of the bar 1 or drill under improper resistance to the side cutting tool.

The means for mounting the improved side or balancing roller in the bar 1 is of importance, as it permits the roller to be adjusted to and from the surface of the bar 1, as desired, in order to compensate for larger or smaller side cutting tools, as may be desired. Furthermore, the bar 5 acts to reinforce and strengthen this part of the structure, and particularly is this true when the boring tool as here shown has its shank interposed between the bar 5 and the lateral extension of the side boring tool.

Having described the invention what is claimed as new is:—

1. A rotary drill comprising a head, a boring tool removably seated in the end thereof, a side cutting tool mounted in a recess formed in the head and a guiding member comprising a bar seated in said recess and a roller mounted in the bar beyond the drill head.

2. A rotary drill comprising a head, a boring tool mounted in the end thereof, a side cutting tool mounted in a recess formed in the head and intercepted by the boring tool, and a guide member comprising a bar having a roller mounted in the end thereof, said bar adapted to pass into said recess and in contact with the shank of the boring tool, and means for securing the said guide member, boring tool and side cutting tool in position in the bar.

In testimony whereof I affix my signature.

HENRY J. JANSEN.